Patented Apr. 29, 1952

2,594,480

UNITED STATES PATENT OFFICE 2,594,480

BIS(p - CHLOROPHENYLMERCAPTO) METHANE AND INSECTICIDAL COMPOSITIONS THEREOF

David T. Mowry, Dayton, Ohio, assignor to Monsanto Chemical Company, St. Louis, Mo., a corporation of Delaware No Drawing. Application June 2, 1949,
Serial No. 96,827

4 Claims. (Cl. 167—30)

This invention provides a new chemical composition of matter, namely, bis(p-chlorophenylmercapto)methane, the structure of which may be written as follows:

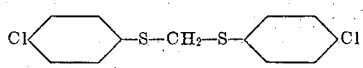

This new compound may be prepared by the reaction of p-chlorothiophenol with methylene bromide in sodium alcoholate. It may also be prepared by the condensation of p-chlorothiophenol with formaldehyde in slightly acid solutions.

Para-chlorothiophenol may be prepared by the reduction of para-chlorobenzene sulfonylchloride using zinc or iron and sulfuric acid.

Para-chlorobenzene sulfonylchloride may be prepared by the direct reaction of chlorosulfonic acid on chlorobenzene.

The following example illustrates the preparation of the intermediate compounds and also the preparation of the present compound, namely, bis(p-chlorophenylmercapto)methane.

EXAMPLE

*p-Chlorobenzene sulfonylchloride.*—746 g. of chlorobenzene was added dropwise to 3.2 kg. of chlorosulfonic acid, while keeping the temperature below 30° C. After the addition of chlorobenzene is complete, the temperature is raised to 90° C. and held for one hour. The product is cooled and then poured onto cracked ice. The compound is filtered off and without drying is used in the next step. Yield=1640 g. of wet material.

*p-Chlorothiophenol.*—7.2 kg. of chipped ice and 2.4 kg. of concentrated sulfuric acid are placed in a 12 liter flask equipped with stirrer, thermometer and reflux condenser. The flask is additionally cooled by immersion in an ice-salt bath. 820 g. of the p-chlorobenzene sulfonylchloride produced as above is placed in the flask and then 1.2 kg. of zinc dust is added over one-half hour, the temperature meanwhile being kept below about 0° C. The mixture is stirred for one and one-half hours at a temperature of 0° C. or below. The ice-bath is then removed and the flask warmed up slightly. A vigorous reaction takes place with evolution of hydrogen gas. When this has ceased, the flask is heated to boiling and refluxed until the solution is clear, which requires from 4 to 7 hours. The organic material in the solution is then steam distilled and water separated from the distillate. The p-chlorothiophenol is then distilled at a temperature of 88.5° to 90° at a pressure of 12.8–13.4 mm. Yield=363 g. or 78.5%, based upon chlorobenzene employed.

*Bis (p - chlorophenylmercapto) methane.*—Into a three-necked flask, provided with condenser, stirrer and dropping funnel, was placed 400 cc. of absolute ethanol. One gram mole of sodium was added slowly with stirring, then one gram mole of p-chlorothiophenol was slowly added, followed by 0.5 mole of methylene bromide. The reaction taking place is exothermic. The mixture is allowed to stand overnight and then refluxed for two and one-half hours. The product was poured over 1 kg. of chipped ice and filtered. The recovered product is recrystallized from ethanol. Yield, 136 g. equivalent to 93% of theory, melting point 42.5°–44° C.

C: theory, 51.83%; found, 52.05%, 51.62%.
H: theory, 3.34%; found, 3.84%, 3.74%.
Cl: theory, 23.54%; found, 22.92%, 22.99%.

The present compound may be used as an insecticide for combating insect pests. It has shown effective control of mites, including particularly the two-spotted mite. It may be combined with standard insecticide carriers, such as powders, solvents or emulsions. For the purpose of application to insect infested vegetation, the compound was added to an oil-water emulsion, so as to give a concentration varying from 1:100 to 1:5000 and applied to bean plants infested with the two-spotted mite. For control purposes, a comparison was also run on the oxygen analogue, namely, the compound in which oxygen replaces the two sulfur atoms in the present compound. The results so obtained follow:

INSECT: 2-SPOTTED MITE ON BEAN, MOBILE FORM

| Concentration | 1-100 | 1-1000 | 1-2000 | 1-5000 |
|---|---|---|---|---|
| | Per Cent Kill | | | |
| Bis(p-chlorophenylmercapto)methane | 100 | 100 | 96-99 | 81-95 |
| Oxygen analogue | 100 | 21-80 | | |

2-SPOTTED MITE ON BEAN: EGGS

| Bis(p-chlorophenylmercapto)methane | 100 | 100 | 96-99 | 21-80 |
| Oxygen analogue | 100 | 0 | | |

Solvents which are suitable for dissolving the bis(p - chlorophenylmercapto)methane may be any aliphatic or aromatic hydrocarbon oil, and preferably those which have boiling points within the range of from about 176° F. and 760° F. at atmospheric pressure. Typical examples of suitable hydrocarbon oils are benzene, toluene, xylene, monomethyl naphthalenes, dimethyl naphthalenes, trimethyl naphthalenes, tetramethyl naphthalenes, ethyl naphthalenes, pine oil and mixtures of oils containing aromatic hydrocarbons. Also petroleum fractions boiling within the above range which are partly aromatic in nature or contain at least 15% (and preferably 20%) of aromatic hydrocarbons may also be used. Solutions prepared utilizing the above hydrocarbon solvents should have a concentration of active material varying from one part of active compound per 500 parts of solvent up to 10% to 20% by weight of solvent. Emulsions containing the active ingredient may be made from various hydrocarbon solutions, as described above, merely by the addition of such solutions to water. In general hydrocarbon solutions of the present compound are mixed with water and various emulsifiers are added thereto which serve to maintain the hydrocarbon oil as an oil-in-water emulsion. Suitable emulsifiers are surface active agents, such as organic sulfates or sulfonates having a Draves wetting time of 10.5 seconds or less in 0.5% aqueous solution. Specific examples of surface active agents are the alkali metal and amine salts of mono-, di- or trisulfonated aromatic hydrocarbons of the benzene series, such as benzene, toluene and xylene, wherein the aromatic nucleus also contains an aliphatic side chain having from 10 to 18 (and preferably 10–14) carbon atoms. Typical examples of these emulsifying agents are the alkali metal, preferably sodium salts of decyl, dodecyl, tetradecyl or octadecyl benzenesulfonic acids, as well as the corresponding di- or trisulfonated products.

Other types of surface active agents, for example, those products which consist of condensation products of ethylene oxide with a branched chain mercaptan, may also be used. Such products are preferably reacted with sufficient ethylene oxide so as to furnish from 5 to as high as 40 moles of condensed ethylene oxide per mole of mercaptan. Mixtures of these ethylene oxide condensation products with one or more of the organic sulfonates may also be used.

Dry powders suitable for compounding dusting insecticides, such as those composed of bentonite, pyrophyllite, wood flour, finely divided dusting sulfur, carbon black, etc. may also be mixed with the bis(p-chlorophenylmercapto)methane for the purpose of producing insecticides suitable for application to insects. Dusting powders of this type should generally contain from 0.01% to 5% or 10% by weight of the active constituent.

What I claim is:

1. Bis(p-chlorophenylmercapto)methane.
2. An insecticidal product comprising bis(p-chlorophenylmercapto)methane and an insecticide carrier therefor.
3. An insecticidal product comprising bis(p-chlorophenylmercapto)methane dissolved in a hydrocarbon solvent.
4. The process of combating insect pests which comprises applying to insect infested vegetation, an insecticide containing bis(p-chlorophenylmercapto)methane as the active toxicant.

DAVID T. MOWRY.

REFERENCES CITED

The following references are of record in the file of this patent:

UNITED STATES PATENTS

| Number | Name | Date |
| --- | --- | --- |
| 2,291,528 | Bruson et al. | July 28, 1942 |

OTHER REFERENCES

Campbell et al.: J. Econ. Ent., vol. 27, pages 1176–1185 (see page 1180, comp. No. 1118) (1934).